United States Patent
Tuennermann et al.

(10) Patent No.: US 9,459,403 B2
(45) Date of Patent: Oct. 4, 2016

(54) GENERATION OF AZIMUTHALLY OR RADIALLY POLARIZED RADIATION IN OPTICAL WAVEGUIDES

(75) Inventors: Andreas Tuennermann, Weimar (DE); Christoph Jocher, Stuttgart (DE); César Jauregui Misas, Jena (DE); Jens Limpert, Jena (DE)

(73) Assignees: Fraunhofer-Gesellschaft zur Foerderung der angewandten Forschung e.V., Munich (DE); Friedrich-Schiller-Universitaet Jena, Jena (DE)

( * ) Notice: Subject to any disclaimer, the term of this patent is extended or adjusted under 35 U.S.C. 154(b) by 0 days.

(21) Appl. No.: 14/111,279

(22) PCT Filed: Apr. 14, 2011

(86) PCT No.: PCT/EP2011/001881
§ 371 (c)(1),
(2), (4) Date: Jan. 8, 2014

(87) PCT Pub. No.: WO2012/139598
PCT Pub. Date: Oct. 18, 2012

(65) Prior Publication Data
US 2014/0112612 A1    Apr. 24, 2014

(51) Int. Cl.
*G02B 6/10* (2006.01)
*H01S 3/067* (2006.01)
(Continued)

(52) U.S. Cl.
CPC ............. *G02B 6/105* (2013.01); *H01S 3/0675* (2013.01); *H01S 3/06712* (2013.01); *G02B 27/286* (2013.01); *H01S 3/0804* (2013.01)

(58) Field of Classification Search
CPC ........ G02B 6/276; G02B 5/18; G02B 6/024; G02B 5/30; G02B 27/286
See application file for complete search history.

(56) References Cited

U.S. PATENT DOCUMENTS

| 7,496,257 B2 * | 2/2009 | Levner et al. ................ 385/37 |
| 2003/0002041 A1 * | 1/2003 | Peupelmann et al. ........ 356/364 |
| 2006/0268408 A1 * | 11/2006 | Toussaint ............ G02B 27/286 359/489.07 |

(Continued)

FOREIGN PATENT DOCUMENTS

| EP | 1 359 646 A1 | 11/2003 |
| WO | 03/063308 A1 | 7/2003 |
| WO | 2007/051082 A2 | 5/2007 |

OTHER PUBLICATIONS

International Search Report of PCT/EP2011/001881, mailed Jul. 9, 2012.

(Continued)

*Primary Examiner* — Thomas A Hollweg
*Assistant Examiner* — Mary A El Shammaa
(74) *Attorney, Agent, or Firm* — Collard & Roe, P.C.

(57) ABSTRACT

The invention relates to an apparatus for generating azimuthally or radially polarized radiation by means of an optical waveguide (1), wherein the optical waveguide (1) has a structure which is suitable for conducting azimuthally or radially polarized modes (5, 7). The invention proposes that the azimuthally or radially polarized modes (5, 7) in the optical waveguide (1) have different effective refractive indices and, within the optical waveguide (1), a narrow-band grating (2) is arranged, in particular a fiber Bragg grating (2) which is designed such that the spectral distance between two azimuthally or radially polarized resonant modes (5, 7) is equal to or greater than the associated spectral bandwidth.

10 Claims, 2 Drawing Sheets

(51) Int. Cl.
  *G02B 27/28* (2006.01)
  *H01S 3/08* (2006.01)

(56) References Cited

U.S. PATENT DOCUMENTS

2007/0115551 A1* 5/2007 Spilman .............. G02B 27/286
   359/489.07
2009/0202191 A1 8/2009 Ramachandran

OTHER PUBLICATIONS

Ramachandran and Yan: Generation of Radially Polarised Beams from Optical Fibers, Proceedings of the OFC/NFOEC 2008, Piscataway, NJ, USA, Feb. 24-28, 2008, pp. 1-3, XP002665658.
Poole C D et al: Helical-Grating Two-Mode Fiber Spatial-Mode Coupler, Journal of Lightwave Technology, IEEE Service Center, New York, NY, US, vol. 9, No. 5, May 1, 1991, pp. 598-604, XP000206687.
Lee KS: Coupling analysis of spiral fiber gratings, Optics Communications, North-Holland Publishing Co. Amsterdam, NL, vol. 198, No. 4-6, Nov. 1, 2001, pp. 317-324, XP004323177.
Guan et al: Single-polarisation, single-frequency, 2 cm ytterbium-doped fibre laser, Electronics Letters, IEE Stevenage, GB, vol. 43, No. 10, May 10, 2007, XP006028736.
Alexeyev C N et al: Fibre vortex mirror based on a twisted elliptical-core optical fibre, Journal of Optics. A, Pure and Applied Optics, Institute of Physics Publishing, Bristol, GB, vol. 9, No. 10, Oct. 1, 2007, pp. 931-935, XP020123244.
Grosjean, T. et al: An all-fiber device for generating radially and other polarized light beams,Optics Communications 203 (2002), pp. 1-5.
The Fiber Optic Association, Inc., Guide to Fiber Optics & Premises Cabling, 2010, http://www.thefoa.org/tech/ref/testing/test/CD_PMD.html.

* cited by examiner

GENERATION OF AZIMUTHALLY OR RADIALLY POLARIZED RADIATION IN OPTICAL WAVEGUIDES

CROSS REFERENCE TO RELATED APPLICATIONS

This application is the National Stage of PCT/EP2011/001881 filed on Apr. 14, 2011, the disclosure of which is incorporated by reference. The international application under PCT article 21(2) was not published in English.

BACKGROUND OF THE INVENTION

1. Field of the Invention

The invention relates to an apparatus for generating azimuthally or radially polarized radiation by means of an optical waveguide, wherein the optical waveguide has a structure which is suitable for conducting azimuthally or radially polarized modes.

2. The Prior Art

Devices which emit radially or azimuthally polarized radiation are of great interest for a multitude of applications in the field of science, medical technology, military technology or civil engineering, for example for material machining, microscopy or for so-called optical tweezers, too. These applications call for light sources with azimuthally or radially polarized radiation, in particular simple, stable, powerful and cost-efficient sources with a high polarization purity.

In prior art, optical waveguides already exist, in particular glass fibres, which have a structure that is suitable for conducting various azimuthally or radially polarized modes. However, up to now it has not been managed satisfactorily to generate these modes stable and at small expenditure within the waveguide.

Only if the waveguide structure allows for higher modes it is possible for radially or azimuthally polarized modes to propagate within the optical waveguide. To be highlighted here in particular with rotation-symmetrical waveguide structures are the two $TE_{01}$ and $TM_{01}$ modes which, among others, have the property of an azimuthal and radial polarization. A problematic aspect herein is that modes with an approximately equal effective refractive index combine among each other so that a predominantly linearly polarized light beam is developed from the azimuthally or radially polarized modes. This is called a degeneration of modes. For example, in certain structures, the $TE_{01}$ and $TM_{01}$ modes combine with the $HE_{21}$ modes to develop a light beam with a linear polarization. Waveguide structures admitting such combinations are called "weakly conducting".

In prior art, there are various approaches to solve this problem. For example, with weakly-conducting multi-mode fibres, a radially polarized mode can be selectively excited by coupling a basic mode with an offset into the fibre (see T. Grosjean, D. Courjon and M. Spajer "An all-fiber device for generating radially and other polarized light beams", Optics Communications, vol. 203, pp. 1-5, 2002). By means of a special fibre design, too, for example according to US 2009/0202191 A1, it is possible to generate a radially or azimuthally polarized mode. Herein, the fibre design enables a conversion of an already existing linearly polarized light beam. In combination with micro-bending and a polarization filter, the power of the basic mode within the fiber can be coupled into a radially or azimuthally polarized mode each.

Solutions known from prior art have a problem in that one cannot take recourse to standard components. Hereby, these are expensive and experimentally complex. The use of specially produced optical elements, each of which leading either to a radial or azimuthal polarization, is always mandatory. The necessary high expenditure on adjustments shows a direct influence on the polarization purity of the radiation. Therefore, often only a low polarization purity can be observed. Furthermore, weakly-conducting waveguides additionally entail a problem in that the azimuthally or radially polarized modes combine with other modes, thus reducing the polarization purity of the azimuthally or radially polarized beam.

SUMMARY OF THE INVENTION

Now, therefore, it is the object of the present invention to provide a simple, stable and cost-effective radiation source which generates azimuthally or radially polarized radiation. Furthermore, it is an object of the present invention to provide a device in which it is possible to change between azimuthal and radial polarization within the waveguide in a simple manner.

This object is achieved by the present invention in that azimuthally or radially polarized modes in the optical waveguide have different effective refractive indices and, within the optical waveguide, a narrow-band grating is arranged, in particular a fibre Bragg grating, which is designed such that the spectral distance between two azimuthally or radially polarized resonant modes is equal to or greater than the associated spectral bandwidth.

The inventive device utilizes the principle of the so-called "strong conduct" within the waveguide. Herein, the azimuthally and radially polarized modes have different effective refractive indices and thus they can be spectrally separated through a grating. The grating converts the difference in the effective refractive index into a difference in the reflexion wavelength. However, the wavelength difference between the modes in practice is very small. Apart from the different refractive indices, it is therefore required that the grating is sufficiently narrow-band in its spectrum in order to be able to separate the azimuthally or radially polarized modes satisfactorily from each other. For an optimal separation, the spectral distance between two resonant modes should at least be as large as its bandwidth or even larger. The wavelength difference $\Delta\lambda$ which is generated by a fibre Bragg grating with a grating period $\Lambda$ can be calculated for two different effective refractive indices $n_{eff1}$ and $n_{eff2}$ from the Bragg condition:

$$\Delta\lambda = 2(n_{eff1} - n_{eff2})\Lambda.$$

As the wavelength difference $\Delta\lambda$ is very small, the grating spectrum must be sufficiently narrow-band in order to ensure sufficient polarization purity. If the grating is broadband, the reflective modes overlap each other and polarization purity drops.

Furthermore, one embodiment of the present invention provides for that the grating is an inhomogeneous fiber Bragg grating which is designed such that it converts one mode of the waveguide, in particular the basic mode, into at at least one azimuthally or radially polarized mode. Through an inhomogeneous grating constant of the fibre Bragg grating, a mode conversion can take place within the waveguide. Herein, a mode of a certain order is converted through the fiber Bragg grating into a mode of a different order. For example, it is thereby possible to convert the basic mode into a $TE_{01}$, a $TM_{01}$ and an $HE_{21}$ mode.

In accordance with the invention, the optical waveguide with the grating arranged therein can be arranged outside or inside a laser oscillator. With an arrangement of the waveguide outside the oscillator, the radiation of the light source is coupled via optical elements into the strongly conducting waveguide structure. The grating reflects the light according to the wavelength either as an azimuthally or radially polarized mode. By way of a decoupler, in particular a beam splitter or circulator, arranged between the light source and the optical waveguide, the azimuthally or radially polarized radiation can be separated from the other radiation of the light source. The inventive device thus serves as an externally arranged polarization filter.

In case of an optical waveguide arranged within the oscillator, it is recommendable that the optical waveguide is endowed with a laser-active material. The laser-active material is excited via the radiation from the light source. The two reflecting elements of the oscillator on the one side are the grating arranged within the optical waveguide and on the other side an optical element with wavelength-dependent reflexion behaviour, in particular an optical grating or a wavelength filter. Depending on the angle of the external grating, the oscillator supports only a certain wavelength. If this wavelength is harmonized to the reflexion properties of the grating arranged within the optical waveguide, only an azimuthally or radially polarized mode occurs within the optical waveguide and thus also within the oscillator.

The invention furthermore provides for that the reflexion properties of the grating can be influenced thermally or mechanically. By way of a well-aimed warming-up or cooling-down of the grating or also by applying a mechanical force, the reflexion behaviour of the grating is so influenced that one can change between azimuthally and radially polarized modes. This brings a substantial advantage over prior art in which a change between azimuthal or radial polarization cannot be brought about without major expenditure. Furthermore, it is possible to utilize commercially available components.

In the sense of the present invention, the optical grating integrated in the waveguide may be a reflexion grating as well as a transmission grating. Thereby, the inventive device can optionally—depending on the arrangement of the optical setup—execute a mode separation in transmission or reflexion. Recommendable for use as transmission grating is a long-periodical grating (LPG) which couples the non-desired modes into the fiber shell so that only the azimuthally or radially polarized mode is conducted in the core.

The invention furthermore relates to a method for generating azimuthally or radially polarized radiation by means of an optical waveguide, wherein the optical waveguide conducts azimuthally or radially polarized modes. In accordance with the invention, the azimuthally or radially polarized modes in the optical waveguide have different effective refractive indices, wherein the modes are so filtered by means of a grating arranged within the optical waveguide that their associated spectrae do not or only slightly overlap each other.

BRIEF DESCRIPTION OF THE DRAWINGS

Practical examples of the inventions are elucidated by way of figures in the following, where.

DETAILED DESCRIPTION OF THE PREFERRED EMBODIMENTS

Figure 1:
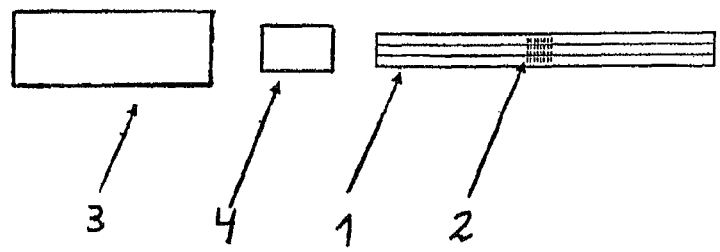
FIG. 1: shows an inventive device for generating azimuthally or radially polarized radiation.

The inventive device shown in FIG. 1 consists of an optical waveguide 1, a fibre Bragg grating 2, a light source 3, and an optical probe 4.

In accordance with the invention, the structure of the optical waveguide 1 must be so designed that it abolishes the degeneration of the modes, i.e. it is "strongly conducting". Hereby, the azimuthally or radially polarized modes obtain different refractive indices. The modes conducted within the optical waveguide 1 are reflected at the fibre Bragg grating 2, wherein the difference between the effective refractive indices of the modes is converted into a difference of the reflexion wavelength. Since the wavelength difference between the modes is relatively small, the fibre Bragg grating 2 must be designed to be sufficiently narrow-band in order to achieve high polarization purity of the modes. If the fibre Bragg grating 2 is too broadband, the reflected modes overlap each other and polarization purity drops.

Figure 2:
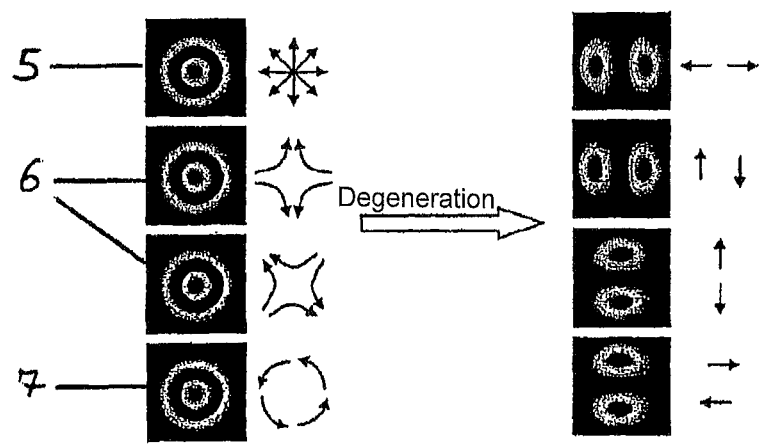
FIG. 2: shows four different modes in strongly-conducting (left) and weakly-conducting (right) waveguides.

FIG. 2 shows a radially polarized $TM_{01}$ mode 5, two $HE_{21}$ modes 6 and an azimuthally polarized $TE_{01}$ mode 7 in the strongly conducting (left) and in the degenerated (right) status within a rotation-symmetrical waveguide 1.

Figure 3:
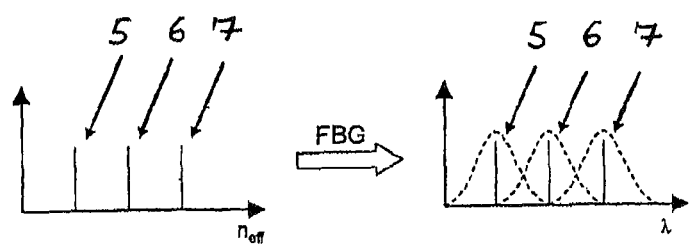
FIG. 3: shows a spectral overlap on modes reflecting to broadband fibre Bragg gratings.

FIG. 3 shows a case where the fibre Bragg grating 2 is designed to be so broadband in relation to the wavelengths of resonant modes 5, 6, 7 that the reflected modes 5, 6, 7 overlap each other. The representation at left shows the effective refractive index of modes 5, 6, 7, the representation at right shows the reflexion spectrum of the fibre Bragg grating 2, pertaining to modes 5, 6, 7.

Figure 4:
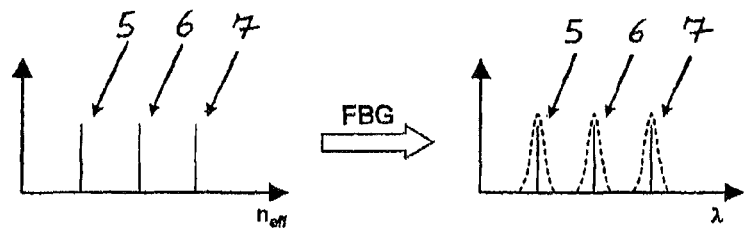
FIG. 4: shows a spectral separation of modes reflected on a narrow-band fibre Bragg grating.

FIG. 4 shows the result of the inventive solution in which the modes 5, 6, 7 are reflected at a spectrally narrow-band fibre Bragg grating 2 so that an overlap of the reflected modes 5, 6, 7 does not occur. Thereby, the strongly conducting rotation-symmetrical waveguide 1 acts with the narrow-band fibre Bragg grating 2 as a mode filter which spectrally separates the $TM_{01}$ mode 5, $HE_{21}$ modes 6 and $TE_{01}$ mode 7 in a well-aimed manner.

Figure 5:
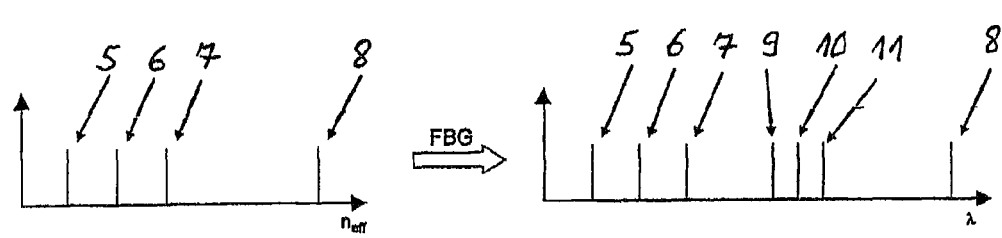
FIG. 5: shows a mode conversion on an inhomogeneous fibre Bragg grating.

In accordance with FIG. 5, the inventive device is implemented in order to convert an existing mode 8 of the waveguide into an azimuthally or radially polarized mode 9, 11. Utilized for this purpose is an inhomogeneous fibre Bragg grating 2 by means of which the so-called mode conversion of modes occurs in the waveguide 1, having the same wavelength distance between the basic mode 8 and the azimuthally or radially polarized modes 5, 7 propagating in the waveguide. Accordingly, a mode 8 of one order is converted through the inhomogeneous fibre Bragg grating 2 into a mode of another order 9, 10, 11. In the present case, the basic mode 8 of the rotation-symmetrical waveguide is converted into the $TM_{01}$ mode 9, the $HE_{21}$ mode 10, and the $TE_{01}$ mode 11. Conversion peaks become evident in the spectrum.

The mode filter described hereinabove can be arranged outside or inside an oscillator.

Figure 6:
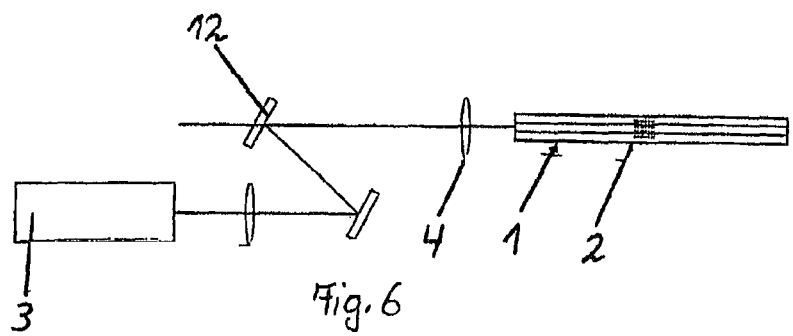
FIG. 6: shows an inventive device arranged outside an oscillator.

For example, FIG. 6 shows an arrangement outside an oscillator. Here, a narrow-banded light source 3 is coupled via a collimation lens, a deflection mirror, a beam splitter 12 and an optical probe 4 into the strongly-conducting waveguide 1. Through the fibre Bragg grating 2, either the azimuthally or radially polarized mode 5, 7 is reflected according to the wavelength. The beam splitter 12 separates the azimuthally or radially polarized beam from the beam of the light source 3 so that the waveguide 1 with the integrated fibre Bragg grating 2 acts as an externally arranged mode filter. If a broadband light source 3 is utilized, a spectral separation through an edge filter or an etalon still has to be effected after the beam splitter 12 in order to obtain a purely radially or azimuthally polarized beam.

Figure 7:
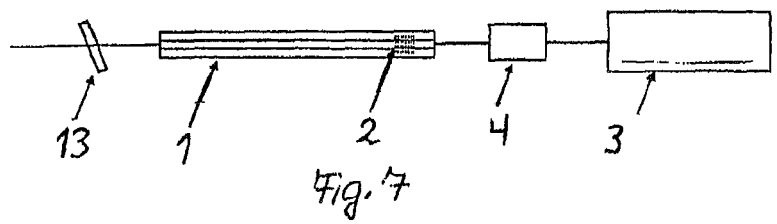
FIG. 7: shows an inventive device arranged inside an oscillator.

An arrangement of the mode filter inside an oscillator is shown in FIG. 7. The strongly-conducting waveguide 1 here is endowed with a laser-active material which is excited by the radiation from light source 3. The radiation is coupled via an optical probe 4 into the waveguide 1. The oscillator is formed by the fibre Bragg grating 2 on the one hand and by an external grating 13 on the other hand. Depending on the angle of the external grating 13, the oscillator only supports a certain wavelength. If this wavelength is harmonized to a resonance wavelength of the fibre Bragg grating 3, then only the azimuthally or radially polarized mode will oscillate.

By thermal reheating or mechanical power influence, the reflexion properties of the fibre Bragg grating 3 can additionally be modified. Hereby it is possible—without modifying the setup—to change between azimuthally and radially polarized modes. Another possibility is given by modifying the wavelength. Here, the outer influences on the grating are kept constant and the change between azimuthally and radially polarized mode is effected through the wavelength of light source 3.

Though in the practical examples the reflexion spectrum of fibre Bragg grating 2 has been utilized primarily, the inventive device can also execute a mode separation in transmission. Accordingly, the transmission grating 2, in particular, may be a long-periodical grating (LPG) which only allows a propagation of an azimuthally or radially polarized mode in the core.

The invention claimed is:

1. Device for generating azimuthally or radially polarized radiation via an optical waveguide,
    wherein the optical waveguide has a structure which is suitable for conducting azimuthally and radially polarized modes, and
    wherein the azimuthally and radially polarized modes in the optical waveguide have different effective refractive indices and, within the optical waveguide, a narrow-band grating is arranged, which is configured to spectrally separate the azimuthally and radially polarized modes, and
    wherein the narrow-band grating is designed such that the spectral distance between two azimuthally and radially polarized resonant modes is equal to or greater than the associated spectral bandwidth.

2. Device according to claim 1, wherein the grating is an inhomogeneous grating which is designed such that it converts one mode of the waveguide into at least one azimuthally or radially polarized mode.

3. Device according to claim 1, wherein the optical waveguide with the grating arranged therein is arranged outside an oscillator.

4. Device according to claim 1, wherein the optical waveguide with the grating arranged therein is arranged inside an oscillator.

5. Device according to claim 3, wherein the optical waveguide is endowed with a laser-active material.

6. Device according to claim 1, wherein the reflection properties of the grating can be influenced thermally or mechanically.

7. Device according to claim 1, wherein one can change between the generation of azimuthally or radially polarized radiation.

8. Device according to claim 1, wherein the grating is a reflection grating.

9. Device according to claim 1, wherein the grating is a transmission grating.

10. Method for generating azimuthally or radially polarized radiation via an optical waveguide,
    wherein the optical waveguide conducts azimuthally and radially polarized modes, and
    wherein the azimuthally and radially polarized modes in the optical waveguide have different effective refractive indices and, via a grating arranged in the optical waveguide, are spectrally separated, wherefore the azimuthally and radially polarized modes are so filtered that their spectrae do not or just slightly overlap each other.

* * * * *